United States Patent
Takeuchi et al.

(10) Patent No.: US 9,550,544 B2
(45) Date of Patent: Jan. 24, 2017

(54) BICYCLE HANDLEBAR CLAMP ASSEMBLY

(75) Inventors: Toshihiko Takeuchi, Osaka (JP); Yoshimitsu Miki, Osaka (JP); Shinya Hirotomi, Osaka (JP)

(73) Assignee: Shimano Inc., Osaka (JP)

( * ) Notice: Subject to any disclaimer, the term of this patent is extended or adjusted under 35 U.S.C. 154(b) by 53 days.

(21) Appl. No.: 13/558,862

(22) Filed: Jul. 26, 2012

(65) Prior Publication Data

US 2014/0026710 A1    Jan. 30, 2014

(51) Int. Cl.
| | |
|---|---|
| F16B 7/04 | (2006.01) |
| B62K 23/06 | (2006.01) |
| B62K 21/12 | (2006.01) |
| F16B 33/00 | (2006.01) |
| F16M 13/02 | (2006.01) |

(52) U.S. Cl.
CPC ............... *B62K 23/06* (2013.01); *B62K 21/12* (2013.01); *F16B 7/04* (2013.01); *F16B 33/00* (2013.01); *F16M 13/02* (2013.01); *Y10T 74/20256* (2015.01); *Y10T 74/20822* (2015.01)

(58) Field of Classification Search
CPC ........... Y10T 74/2078; Y10T 74/20822; Y10T 74/2042; Y10T 74/20438; Y10T 74/2028; Y10T 74/20287; Y10T 74/20043; Y10T 74/20049; B62K 19/30; B62K 19/40; B62K 21/12; B62K 23/02; B62K 23/04; F16B 7/04
USPC ..... 74/551.1, 551.8, 501.6, 502.2, 488, 489, 74/473.14, 473.15, 522, 525; 188/24.22, 188/26, 344; 248/316.1, 316.5, 316.6, 248/229.14, 228.5, 231.61; 411/411–413, 411/417, 423
See application file for complete search history.

(56) References Cited

U.S. PATENT DOCUMENTS

| | | | | |
|---|---|---|---|---|
| 1,939,737 | A | * 12/1933 | Thomson | 411/411 |
| 3,181,391 | A | 5/1965 | Juy | |
| 3,426,321 | A | * 2/1969 | Peterson, Jr. | 439/742 |
| 3,776,061 | A | 12/1973 | Yoshigai et al. | |
| 4,132,296 | A | * 1/1979 | Evett | 192/217 |
| 4,244,235 | A | 1/1981 | Yoshikawa | |
| 4,275,615 | A | * 6/1981 | Yoshigai | 74/489 |

(Continued)

FOREIGN PATENT DOCUMENTS

| | | |
|---|---|---|
| DE | 1 930 715 U | 1/1966 |
| DE | 85 22 018 U1 | 9/1985 |

(Continued)

OTHER PUBLICATIONS

Magura catalogue; Workshop 2007, the passion people; 2006 Germany.
Magura catalogue; 2008, the passion people; 2007 Germany.

*Primary Examiner* — Richard W Ridley
*Assistant Examiner* — Brian McGovern
(74) *Attorney, Agent, or Firm* — Global IP Counselors

(57) ABSTRACT

A bicycle handlebar clamp assembly has a handlebar clamp, a fixing nut, and a fixing bolt. The fixing nut includes a threaded bore having a bolt entrance opening and a bolt exit opening. The fixing nut defines a bolt shaft receiving space disposed adjacent the bolt exit opening. The fixing bolt includes a head and a shaft extending from the head. The shaft has a non-threaded portion disposed between two threaded portions. One of threaded portions is disposed closer to the head of the fixing bolt than the other threaded portion. The threaded portions are dimensioned to threadedly engage the threaded bore of the fixing nut. The non-threaded portion has a axial length that is greater than the axial length of the threaded bore of the fixing nut.

9 Claims, 10 Drawing Sheets

(56) References Cited

U.S. PATENT DOCUMENTS

| | | | |
|---|---|---|---|
| 4,318,307 A * | 3/1982 | Kine | 74/489 |
| 4,434,679 A * | 3/1984 | Shimano | 74/491 |
| 4,790,702 A * | 12/1988 | Maganias | 411/412 |
| 4,877,364 A | 10/1989 | Sorrentino | |
| 4,969,374 A * | 11/1990 | Borromeo | B62K 21/12 280/279 |
| 4,974,469 A | 12/1990 | Romano | |
| 5,138,893 A | 8/1992 | Copeland | |
| 5,203,213 A | 4/1993 | Nagano | |
| 5,458,018 A | 10/1995 | Kawakami | |
| 7,255,359 B2 | 8/2007 | Felsl et al. | |
| 7,594,741 B2 | 9/2009 | Okajima et al. | |
| 8,061,667 B2 | 11/2011 | Weiss et al. | |
| 8,162,343 B2 | 4/2012 | Weiss et al. | |
| 2002/0125388 A1 | 9/2002 | Eslick | |
| 2003/0132335 A1 | 7/2003 | Schmidt | |
| 2004/0069087 A1 | 4/2004 | Lumpkin | |
| 2005/0079756 A1 | 4/2005 | Kawai et al. | |
| 2006/0004392 A1 | 1/2006 | Amarant | |
| 2006/0285343 A1 | 12/2006 | Okajima et al. | |
| 2007/0199401 A1 | 8/2007 | Kawakami et al. | |
| 2008/0060885 A1 | 3/2008 | Ruckh et al. | |
| 2011/0083525 A1 | 4/2011 | Hirose et al. | |

FOREIGN PATENT DOCUMENTS

| | | |
|---|---|---|
| DE | 41 42 034 A1 | 6/1993 |
| EP | 0 894 704 A2 | 2/1999 |
| JP | 63-35688 U | 3/1988 |
| JP | 1-157091 U | 10/1989 |
| WO | 2009/134752 A1 | 11/2009 |

* cited by examiner

BICYCLE HANDLEBAR CLAMP ASSEMBLY

BACKGROUND

Field of the Invention

This invention generally relates to a bicycle handlebar clamp assembly. More specifically, the present invention relates to a bicycle handlebar clamp assembly a mounting arrangement for attaching a bicycle component thereto.

Background Information

Bicycles are often provided with one or more bicycle component operating devices or controllers that are mounted on the handlebar of the bicycle for the rider to easily operate the bicycle component operating device or controller. For example, typically, a brake lever is mounted on each end of the handlebar near the handgrip for operating a brake device that apply braking forces to stop rotation of a wheel. These brake levers are typically mounted by a bracket having a band clamp. Similar, for example, a shifter (e.g., a gear shifting operation device) is often mounted adjacent each of the brake levers for shifting the gears by operating an operating member in the form of a lever, for example. A conventional gear shifting operation device either has its own band clamp that mounts directly on the handlebar, or is mounted on a mounting bracket on one of the brake levers. In conventional practice, in cases in which a shift operating device is provided separately from a brake lever, normally, the gear shifting operation device is attached to the handlebar inside the bracket of the brake lever. If the gear shifting operation device is attached to the handlebar within the brake lever, then the shifter may be difficult to operate, depending on the shape(s) of the operating member(s) of the gear shifting operation device. Thus, the gear shifting operation device is often mounted on the mounting bracket on one of the brake levers.

SUMMARY

Generally, the present disclosure is directed to various features of a bicycle handlebar clamp assembly. In one feature presented in this disclosure is to provide a bicycle handlebar clamp assembly with a fixing bolt for an operating component (e.g., a shifter) that will not readily drop off a handlebar clamp even if the fixing bolt becomes loose. In another feature presented in this disclosure is to provide a bicycle handlebar clamp assembly with an attachment pin that couples a fixing nut to a handlebar clamp such that the fixing nut will not readily drop off the handlebar clamp even if the attachment pin becomes loose.

In view of the above, in one aspect, a bicycle handlebar clamp assembly comprises a handlebar clamp, a fixing nut, and a fixing bolt. The fixing nut is coupled to the handlebar clamp. The fixing nut includes a threaded bore having a bolt entrance opening and a bolt exit opening. The threaded bore has a first axial length between the bolt entrance opening and the bolt exit opening. The fixing nut defines a bolt shaft receiving space disposed adjacent the bolt exit opening. The fixing bolt includes a head and a shaft extending from the head. The shaft has a first threaded portion, a second threaded portion and a non-threaded portion disposed between the first and second threaded portions. The first threaded portion is disposed closer to the head of the fixing bolt than the second threaded portion. The first and second threaded portions are dimensioned to threadedly engage the threaded bore of the fixing nut. The non-threaded portion has a second axial length that is greater than the first axial length of the threaded bore of the fixing nut.

In view of the above, in one aspect, a bicycle handlebar clamp assembly comprises a handlebar clamp, a fixing nut, and a fixing bolt.

Other objects, features, aspects and advantages of the disclosed bicycle handlebar clamp assembly will become apparent to those skilled in the art from the following detailed description, which, taken in conjunction with the annexed drawings, discloses preferred embodiments of the bicycle handlebar clamp assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
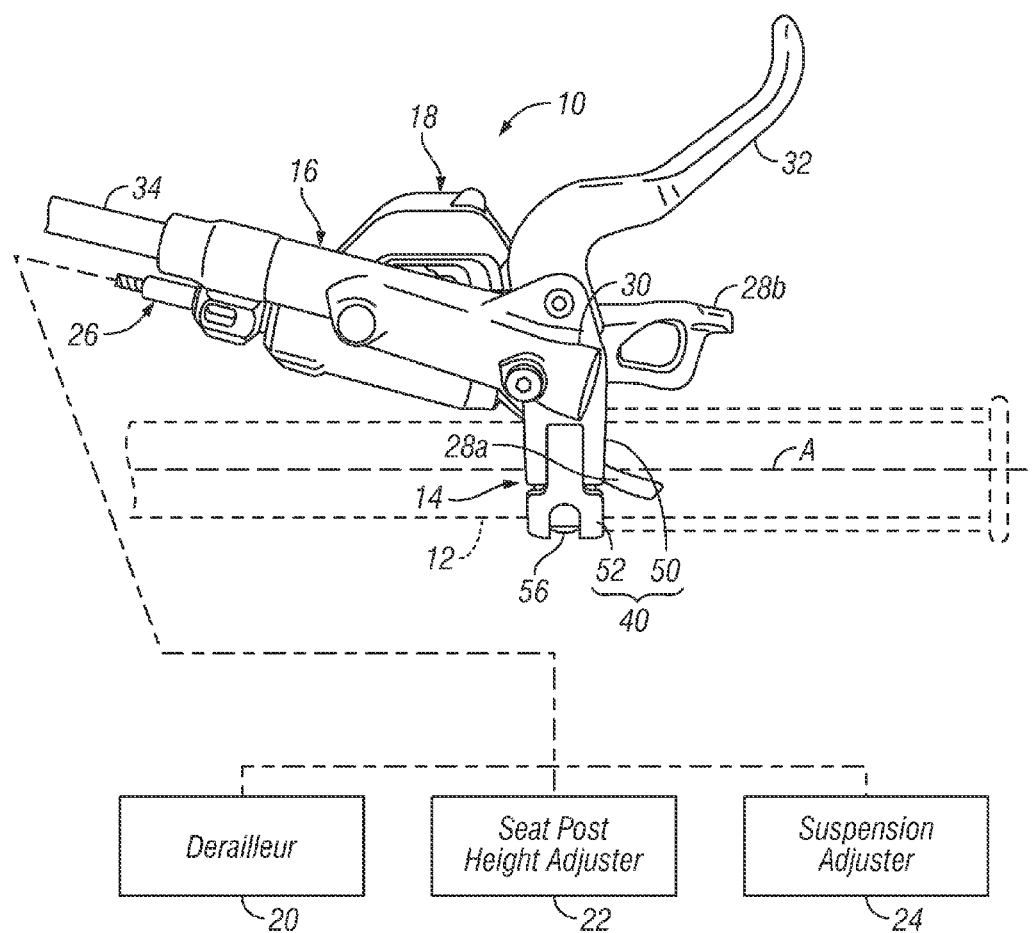
FIG. 1 is a top plan view of a bicycle component operating device attached to a handlebar by a bicycle handlebar clamp assembly in accordance with a first embodiment.
Figure 2:
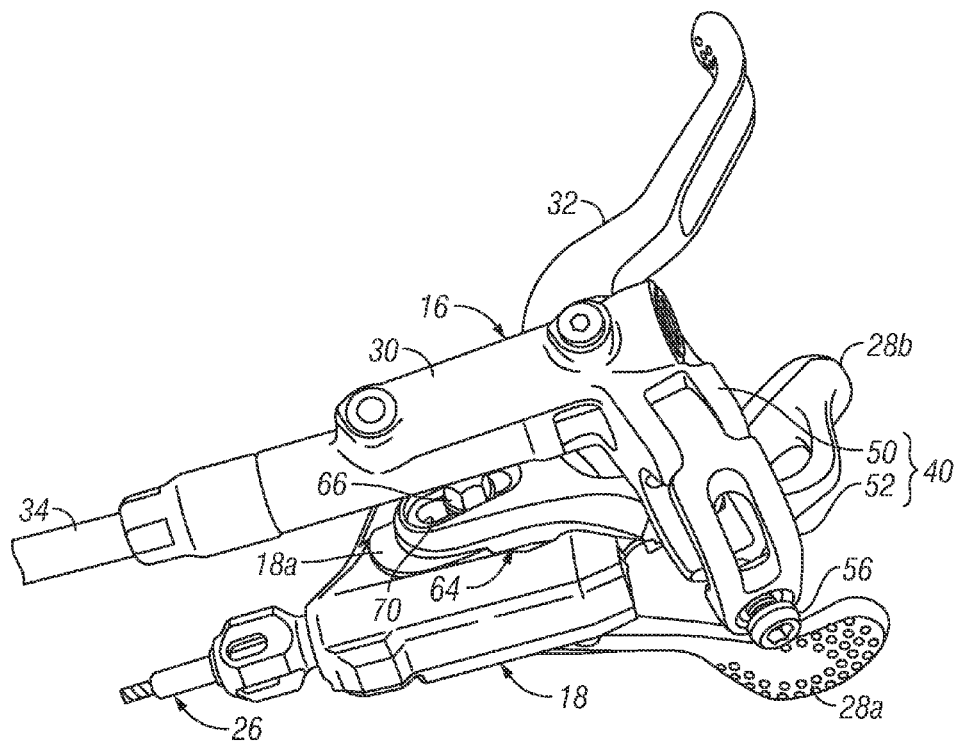
FIG. 2 is a top perspective view of the bicycle component operating device illustrated in FIG. 1.

Referring initially to FIGS. 1 and 2, a bicycle component operating device 10 is illustrated that is attached to a handlebar 12 by a bicycle handlebar clamp assembly 14 in accordance with a first embodiment. Here in the first embodiment, the bicycle component operating device 10 includes a first operating component 16 and a second operating component 18. The first operating component 16 is illustrated in the form of a hydraulic brake operating (actuation) device. On the other hand, the second operating component 18 is illustrated in the form of a cable operating device.

As illustrated in FIG. 1, the first operating component 16 is integrated as a non-separable unit from the bicycle handlebar clamp assembly 14 as explained below. Since hydraulic brake operating device are well known, the first operating component 16 will not be discussed herein. Also, the first operating component 16 is not limited to a hydraulic brake operating device. In other words, the first operating component 16 could be a cable type brake operating device.

As diagrammatically illustrated in FIG. 1, the second operating component 18 operates at least one of a cable operated derailleur 20, a cable operated seat post height adjuster 22 and a cable operated suspension adjuster 24. The derailleur 20, the seat post height adjuster 22 and the suspension adjuster 24 are conventional bicycle components, and thus, they will not be discussed and/or illustrated herein. Thus, the second operating component 18 constitutes at least one of a gear shifting operation device, a seat height controller and a suspension controller. The second operating component 18 is illustrated as a double lever indexing type of cable operating device that includes a first lever 28a and a second lever 28b. Operation of the first lever 28a pulls an inner wire of a control cable 26 in a conventional manner, while operation of the second lever 28b releases the inner wire of the control cable 26 in a conventional manner. However, the second operating component 18 is not limited to this type of cable operating device. Also, the second operating component 18 can be configured to operate more than one bicycle component. Since the second operating component 18 can be a conventional operating device, the details of the second operating component 18 will not be discussed herein.

Figure 3:
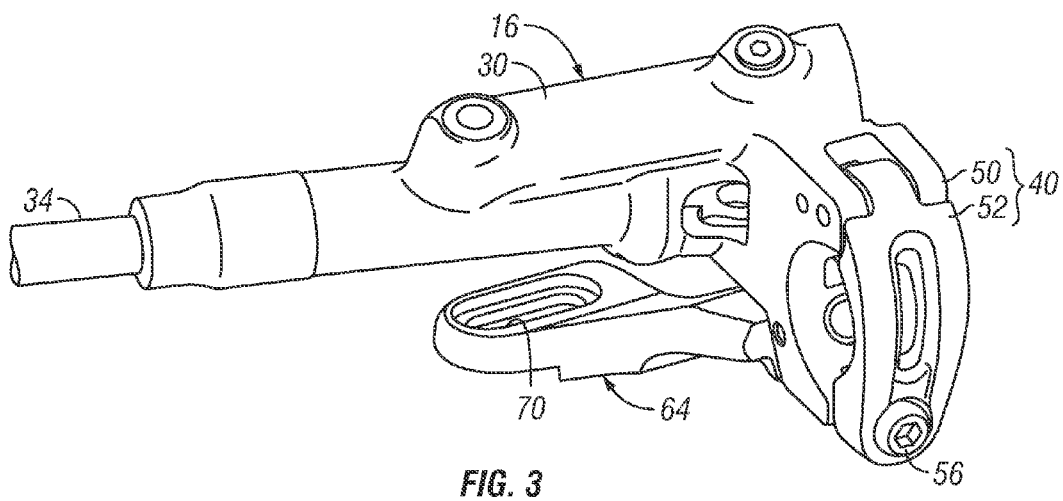
FIG. 3 is a top perspective view of the handlebar clamp assembly illustrated in FIGS. 1 and 2 in which the second operating component has been removed and parts of the first operating component (i.e., the hydraulic brake operating device) have also been removed.

As seen in FIGS. 1 to 3, the first operating component 16 (hydraulic brake actuation device) includes a housing 30 and a brake lever 32. The housing 30 defines a master cylinder (not shown) that houses a piston (not shown). The master cylinder of the housing 30 is operatively (fluidly) coupled to a brake device (not shown) by a hydraulic hose 34. The housing 30 further defines a reservoir (not shown that contains the hydraulic fluid (mineral oil). The master cylinder is fluidly connected to the reservoir. The hydraulic fluid in the master cylinder is pressurized by movement of the piston in the master cylinder in response to the pivotal movement of the brake lever 32 towards the handlebar 12. Thus, operation of the brake lever 32 causes an increase in fluid pressure in the master cylinder of the housing 30 to operate a brake device in a conventional manner. Since the operation of the first operating component 16 is conventional, the first operating component 16 will not be discussed or shown in detail herein.

Figure 15:
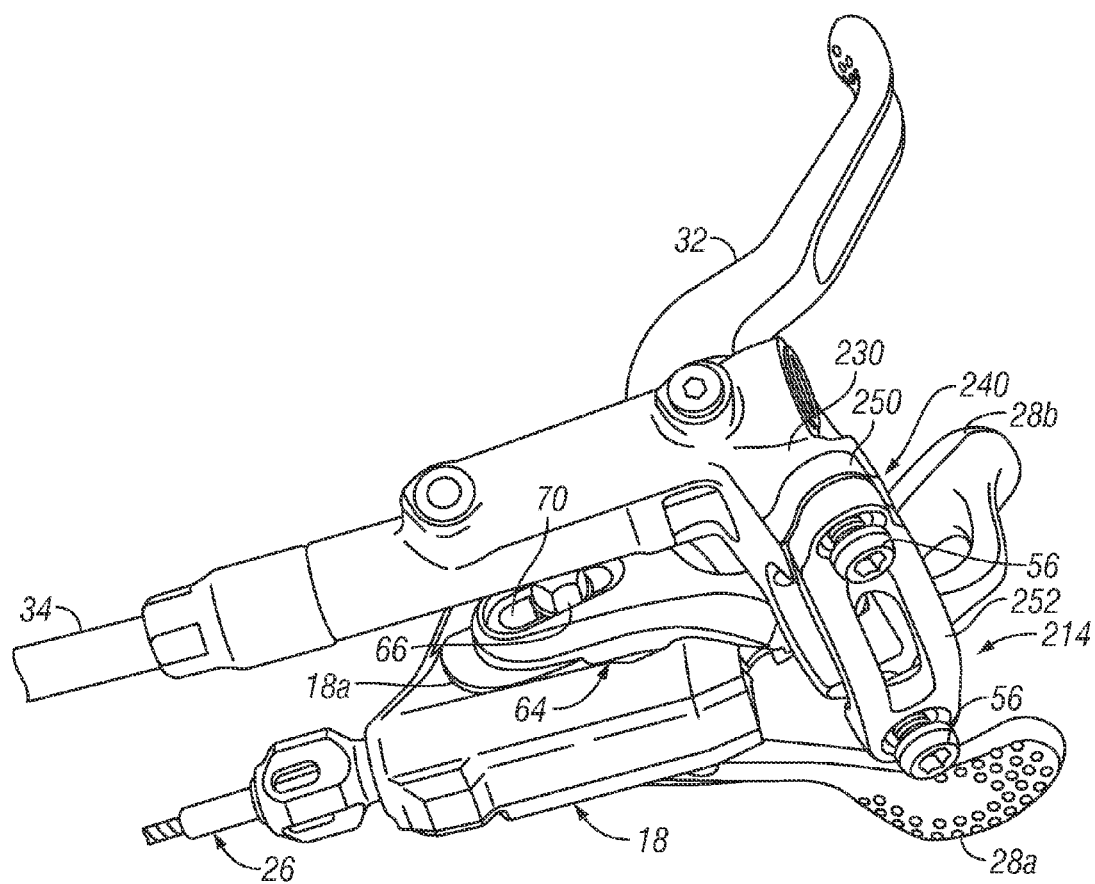
FIG. 15 is a partial exploded perspective view of a portion of a handlebar clamp assembly in accordance with a third embodiment.

Referring now to FIGS. 3 to 7, in the first embodiment, the bicycle handlebar clamp assembly 14 basically includes a handlebar clamp 40, a fixing nut 44, a fixing bolt 46 and an attachment pin 48. The housing 30 of the first operating component 16 is integrally formed with the handlebar clamp 40 of the bicycle handlebar clamp assembly 14 as an integral unit. In particular, the handlebar clamp 40 includes a first clamp part 50 and a second clamp part 52, with the first clamp part 50 being integrally formed with the housing 30 of the first operating component 16 as a one-piece, unitary member. The brake lever 32 is pivotally mounted to the first clamp part 50 of the handlebar clamp 40. The first and second clamp parts 50 and 52 are pivotally connected at first ends by a pivot pin 54. The first and second clamp parts 50 and 52 have second ends that are releasably fastened together by a threaded fastener or bolt 56. In other words, the first and second clamp parts 50 and 52 have first ends hinged together and second ends releasably fastened together by the bolt 56. Alternatively, the first and second clamp parts 50 and 52 can be integrally formed as a one piece member, or the hinge can be replaced with a second bolt 56 as seen in FIG. 15.

In any case, in the illustrated embodiments, the first and second clamp parts 50 and 52 have curved handlebar engagement surfaces 60 and 62, respectively, which define an overall handlebar engagement surface of the handlebar clamp 40. The handlebar engagement surfaces 60 and 62 are curved such that their center of curvature is at or near a longitudinal center axis A of the handlebar 14. Tightening the bolt 56 causes the handlebar engagement surfaces 60 and 62 of the handlebar clamp 40 to squeezes the handlebar 12 for attaching the bicycle component operating device 10 to a bicycle (only the handlebar 14 of the bicycle is illustrated).

Figure 4:
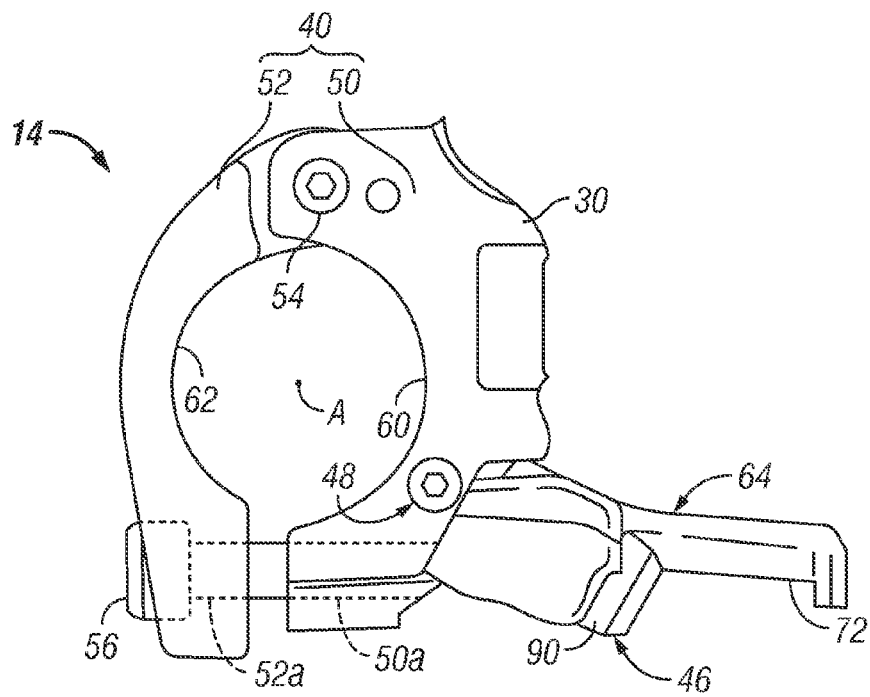
FIG. 4 is a partial side elevational view of the handlebar clamp assembly illustrated in FIGS. 1 to 3, with the cylinder housing of the first operating component (i.e., the hydraulic brake operating device) broken away for purposes of illustration.
Figure 5:
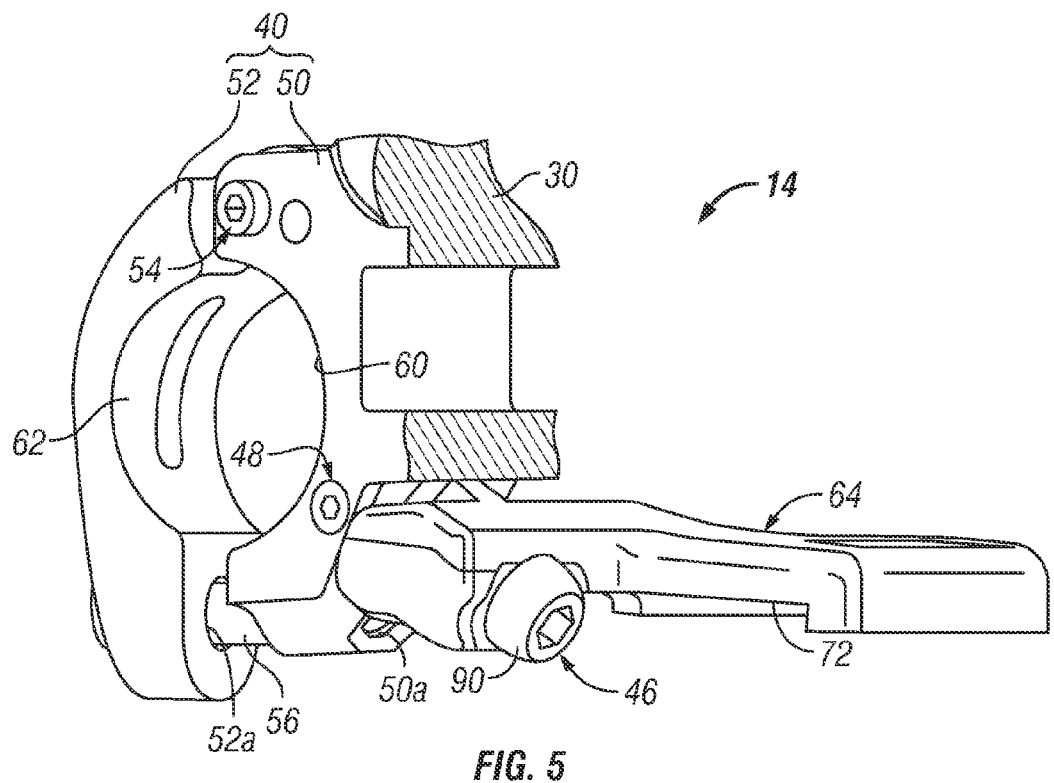
FIG. 5 is a partial side perspective view of the portion of the handlebar clamp assembly illustrated in FIG. 4.
Figure 6:
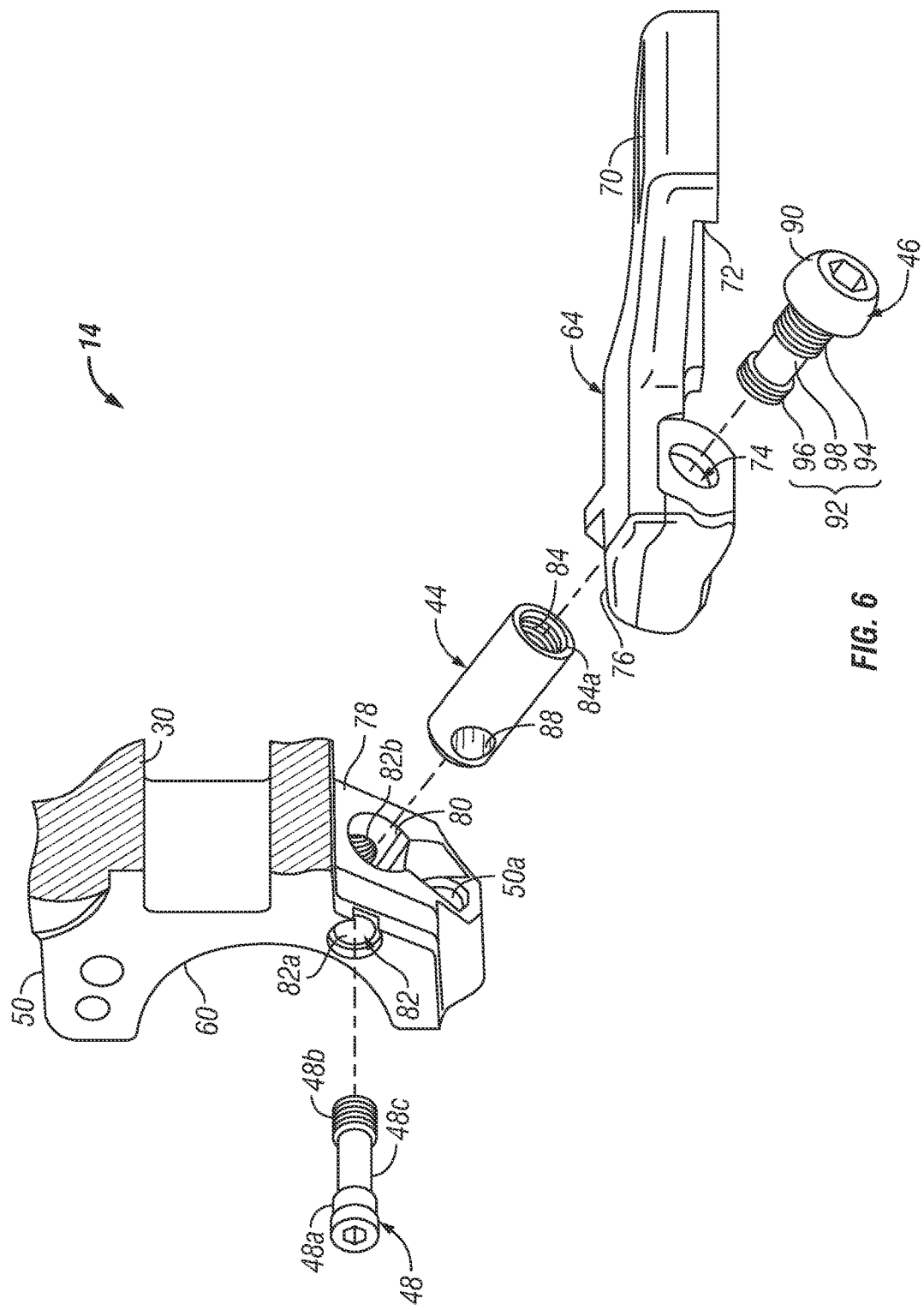
FIG. 6 is a partial exploded perspective view of the portion of the handlebar clamp assembly illustrated in FIGS. 4 and 5.
Figure 7:
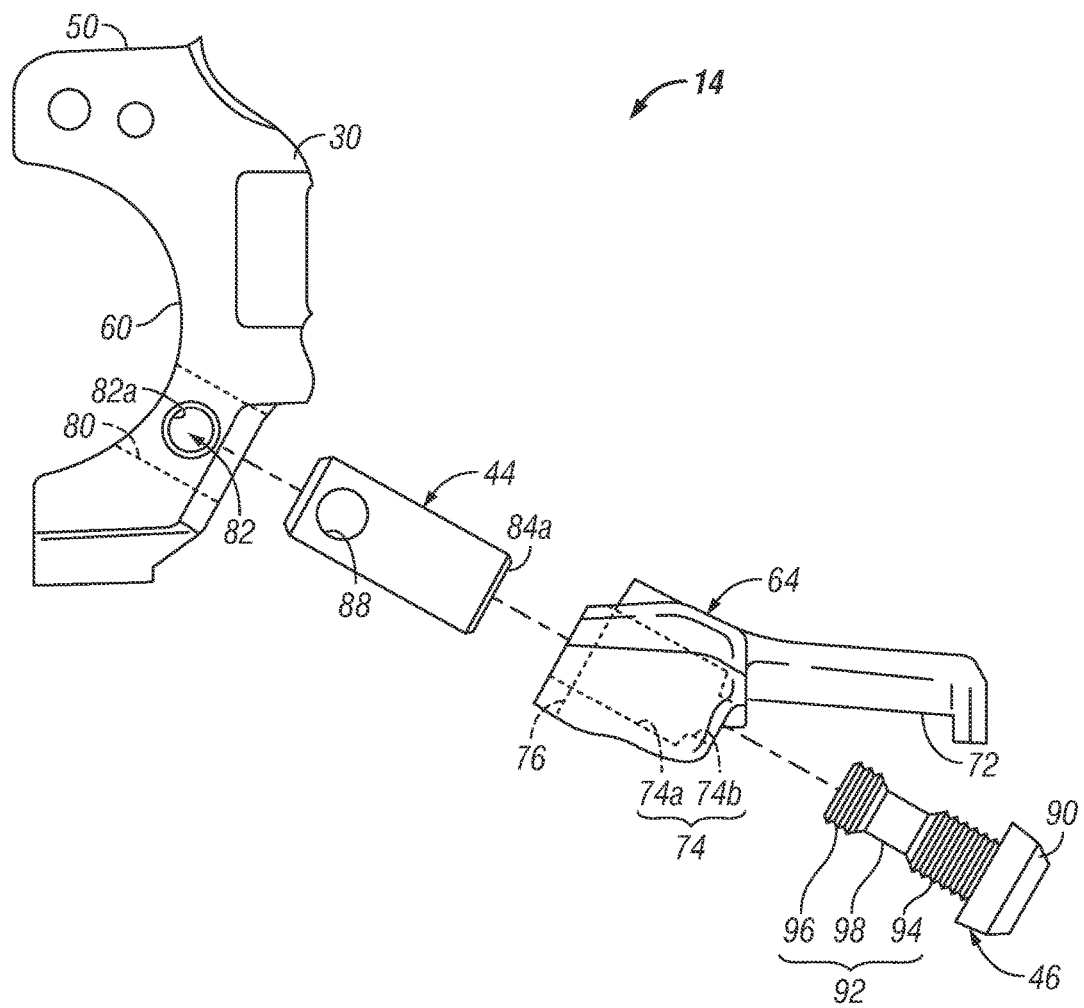
FIG. 7 is a partial exploded side elevational view of the portion of the handlebar clamp assembly illustrated in FIGS. 4 to 6.
Figure 8:
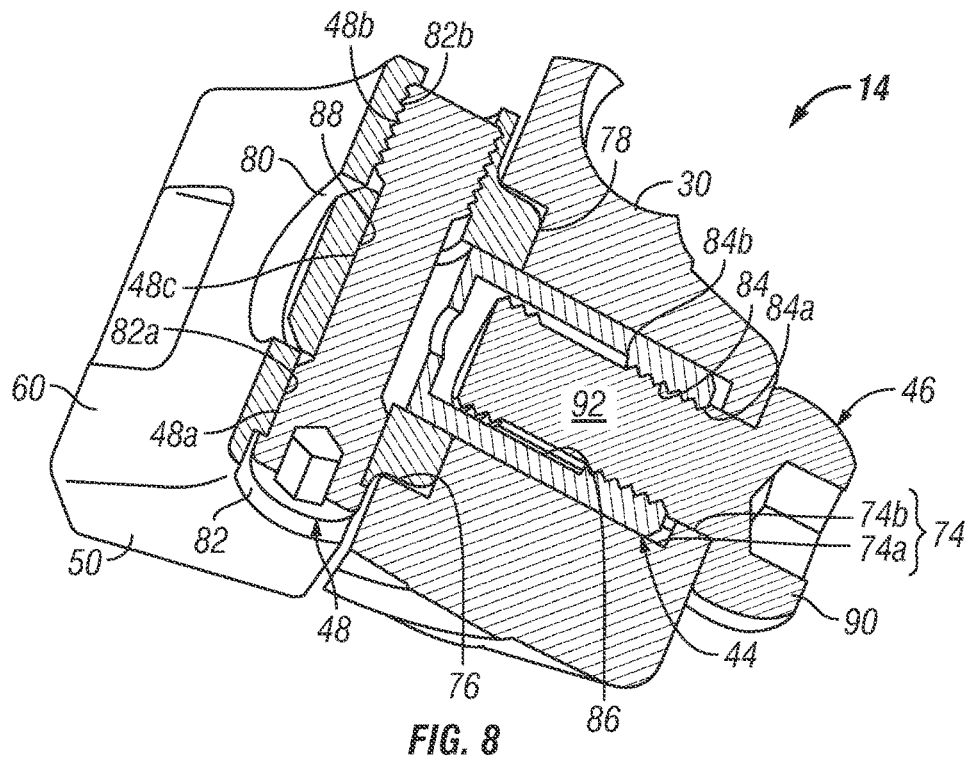
FIG. 8 is a partial cross sectional view of the portion of the handlebar clamp assembly illustrated in FIGS. 4 to 7 as seen along section line 8-8 of FIG. 4.

As seen in FIG. 4, the first clamp part 50 has a threaded hole 50a for threadedly receiving the bolt 56. The second clamp part 52 has a non-threaded hole 52a for receiving the bolt 56 therethrough. By tightening the bolt 56, the first and second clamp parts 50 and 52 move towards each other to squeeze the handlebar 14. Thus, the first and second clamp parts 50 and 52 fixedly secure the first and second operating components 16 and 18 to the handlebar 14. Once the handlebar clamp 40 is non-movably secured to the handlebar 14, the longitudinal center axis A of the handlebar 14 becomes coincident or nearly with a center axis of the handlebar clamp 40. Thus, the longitudinal center axis A as shown in the drawings refers to both the center axis of the handlebar 14 and the center axis of the handlebar clamp 40.

As seen in FIGS. 4 to 7, a component mounting bracket 64 is attached to the first clamp part 50 of the handlebar clamp 40 by the fixing bolt 46 being screwed into the fixing nut 44, which is secured to the first clamp part 50 of the handlebar clamp 40 by the attachment pin 48. In particular, first, the attachment pin 48 secures the fixing nut 44 to the first clamp part 50, and then the fixing bolt 46 is screwed into the fixing nut 44 to fixedly secure the component mounting bracket 64 to the first clamp part 50. The second operating component 18 (e.g., a gear shifting operation device, a suspension controller and/or a seat height controller) is attached to the component mounting bracket 64 by a bolt 66 as seen in FIG. 2.

The mounting bracket 64 constitutes a connecting member for attaching the second operating component 18 to the first operating component 16. The mounting bracket 64 can provide an adjustment function of the second operating component 18 with respect to the first operating component 16 in direction generally parallel with the longitudinal center axis A of the handlebar 14. In particular, the mounting bracket 64 has an elongated slot 70 that extends parallel or substantially parallel to the center axis A while the mounting bracket 64 is fixed to the first clamp part 50. The elongated slot 70 receives the bolt 66 therethrough as seen in FIG. 2. The bolt 66 is screwed to a threaded hole of a stationary part of the second operating component 18. While the second operating component 18 is loosely attached to the mounting bracket 64 by the bolt 66 extending through the elongated slot 70, the second operating component 18 can be adjusted relative to the handlebar clamp 40 in a direction parallel or substantially parallel to the center axis A.

To prevent rotation of the second operating component 18 relative to the mounting bracket 64, the bottom of the mounting bracket 64 includes a recess 72 that extends parallel or substantially parallel to the center axis A while the mounting bracket 64 is fixed to the first clamp part 50. The second operating component 18 has a protrusion 18a that projects from the top surface of the housing of the second operating component 18. The protrusion 18a of the second operating component 18 mates with the recess 72 to prevent rotation of the second operating component 18 relative to the mounting bracket 64.

The mounting bracket 64 preferably also includes a bore 74 disposed at the opposite end of the mounting bracket 64 from the elongated slot 70. The bore 74 is a non-threaded bore that is stepped shaped to define a first bore part 74a and a second bore part 74b. The fixing nut 44 is disposed in the first part 74b of the bore 74 and the fixing bolt 46 extends through second bore part 74b to screw into the fixing nut 44 such that the mounting bracket 64 is retained between the fixing nut 44 and the fixing bolt 46. To prevent rotation of the mounting bracket 64 relative to the handlebar clamp 40, the mounting bracket 64 includes a recess 76 that snugly engages a mating protrusion 78 projecting from the outer surface of the first clamp part 50.

Now, the first clamp part 50 of the handlebar clamp 40 will be discussed in more detail. The first clamp part 50 has a fixing nut receiving aperture 80 for receiving the fixing nut 44 in a reinstallable manner and an attachment bore 82 for receiving the attachment pin 48 in a reinstallable manner. The center axes of the fixing nut receiving aperture 80 and the attachment bore 82 are transversely arranged with the fixing nut receiving aperture 80 and the attachment bore 82 intersecting each other. Preferably, as shown, the center axes of the fixing nut receiving aperture 80 and the attachment bore 82 are perpendicularly arranged with respect to each other. More preferable, as shown, the center axes of the fixing nut receiving aperture 80 and the attachment bore 82 perpendicularly intersect. In this way, with the fixing nut 44 disposed in the fixing nut receiving aperture 80, the attachment pin 48 is inserted into the attachment bore 82 to secure the fixing nut 44 to the first clamp part 50.

The fixing nut receiving aperture 80 extends through the first clamp part 50 of the handlebar clamp 40 from the outer surface of the protrusion 78 to the handlebar engagement surface 60. As explained below, with this arrangement, while the handlebar clamp 40 is fixedly attached on the handlebar 12, the fixing nut 44 is held in an attachment pin drop out prevention position (FIGS. 8 to 11) and prevented from moving to an attachment pin removal position (FIGS. 12 and 13) by the handlebar 12

In the first embodiment, as mentioned above, the fixing nut 44 is fixedly secured to the first clamp part 50 of the handlebar clamp 40 by the attachment pin 48. The bicycle handlebar clamp assembly 14 is not limited to this particular arrangement. For example, the fixing nut 44 and the attachment pin 48 could be eliminated by providing the first clamp part 50 of the handlebar clamp 40 with a threaded hole that directly receives the fixing bolt 46. However, using the fixing nut 44 and the attachment pin 48 has certain benefits that will become apparent from this disclosure.

As best seen in FIGS. 8 to 13, in the first embodiment, the fixing nut 44 has a threaded bore 84, a bolt shaft receiving space 86 and an attachment opening 88. In the illustrated embodiments, the bolt shaft receiving space 86 is a non-threaded bore that is axially aligned with the threaded bore 84 for receiving the fixing bolt 46 to fixedly attach the mounting bracket 64 to the fixing nut 44. It will be apparent from this disclosure that the bolt shaft receiving space 86 can have other configurations as needed and/or desired so long the bolt shaft receiving space 86 permits the axial movement of the fixing bolt 46 from the fixed position to the loose position as explained below. The attachment opening 88 is a non-threaded bore that is extends perpendicularly for receiving the attachment pin 48 to fixedly attach the fixing nut 44 to the handlebar clamp 40. The fixing nut 44, the fixing bolt 46 and the attachment pin 48 cooperate with the first clamp part 50 of the handlebar clamp 40 and/or each other to provide two drop out prevention features. The first drop out prevention feature retains the fixing bolt 46 in an attached but loose state, upon the fixing bolt 46 becoming loose, so as to prevent complete disengagement of the fixing bolt 46 from the fixing nut 44. The second drop out prevention feature retains the fixing nut 44 in an attached state, upon the attachment pin 48 becoming loose, so as to prevent the fixing nut 44 from dropping out of the fixing nut receiving aperture 80.

Figure 9:
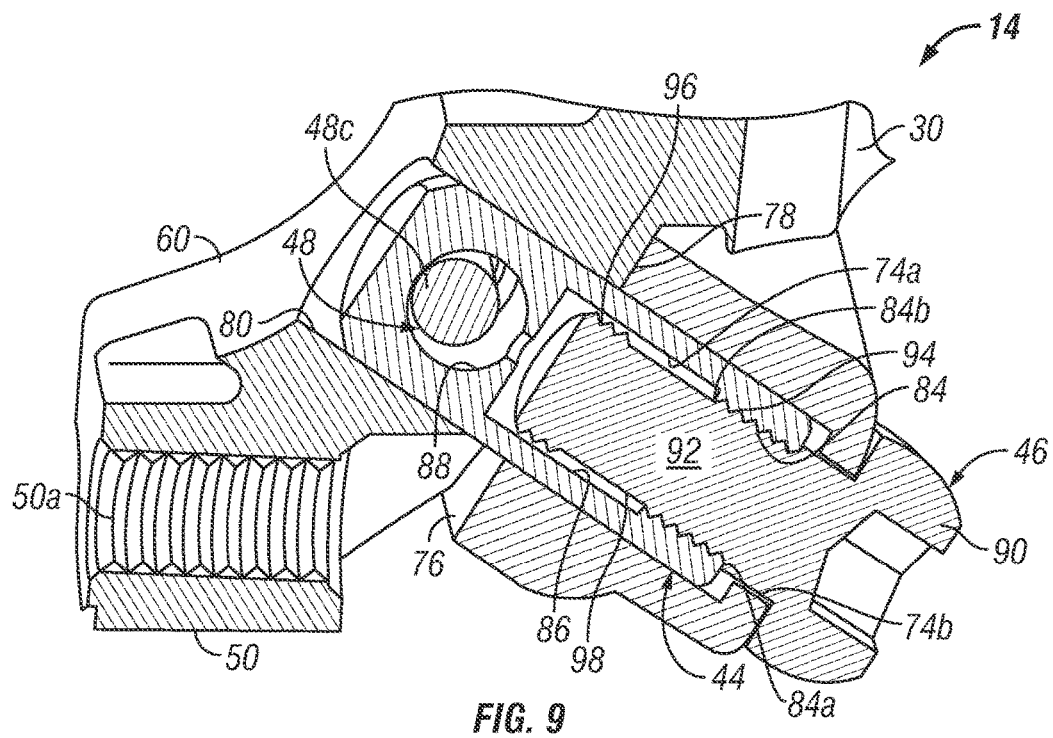
FIG. 9 is a partial cross sectional view of the portion of the handlebar clamp assembly illustrated in FIGS. 4 to 8 as seen along section line 9-9 of FIG. 8.
Figure 10:
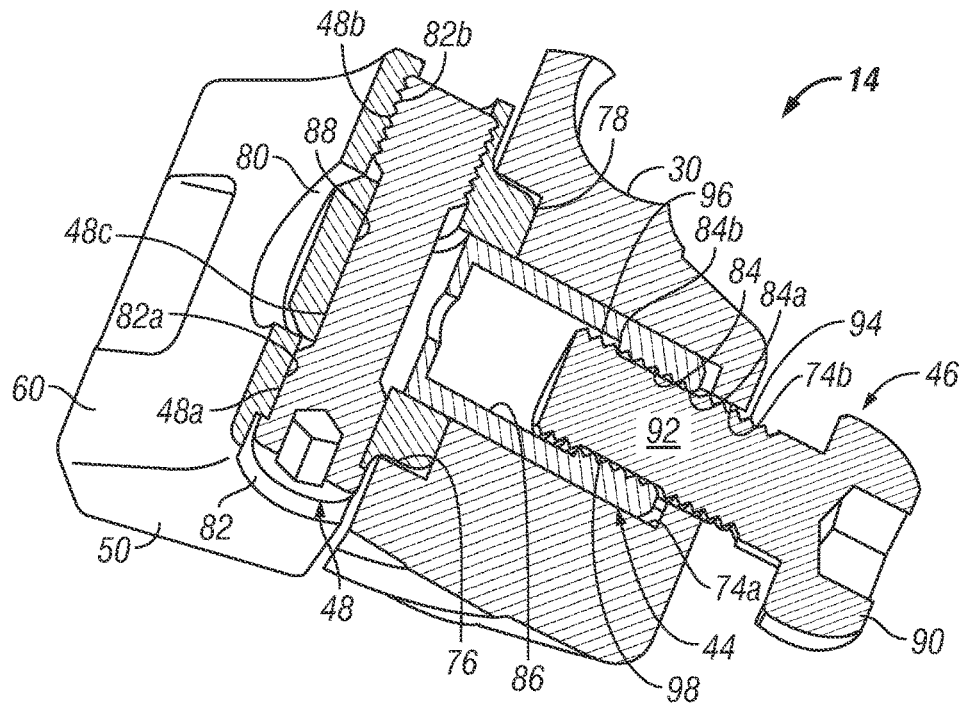
FIG. 10 is a partial cross sectional view, similar to FIG. 8, of the portion of the handlebar clamp assembly illustrated in FIGS. 4 to 7, but with the fixing bolt unthreaded to a dropout prevented position.
Figure 11:
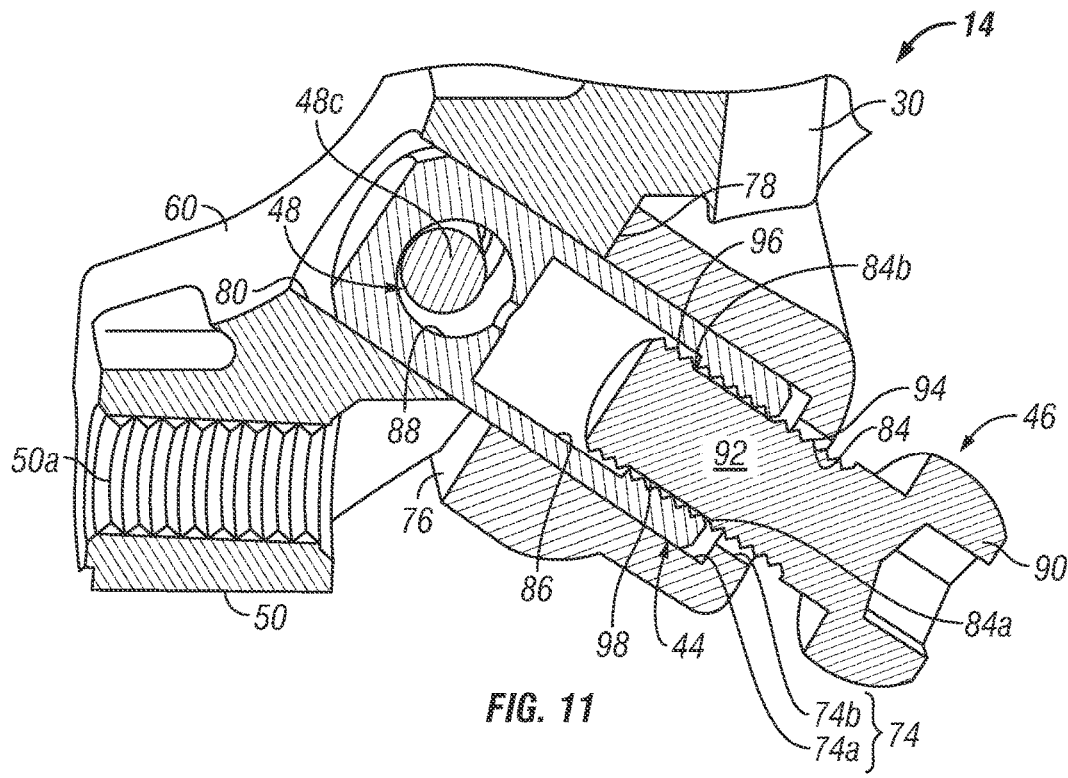
FIG. 11 is a partial cross sectional view, similar to FIG. 9, of the portion of the handlebar clamp assembly illustrated in FIGS. 4 to 7, but with the fixing bolt unthreaded to a dropout prevented position.
Figure 12:
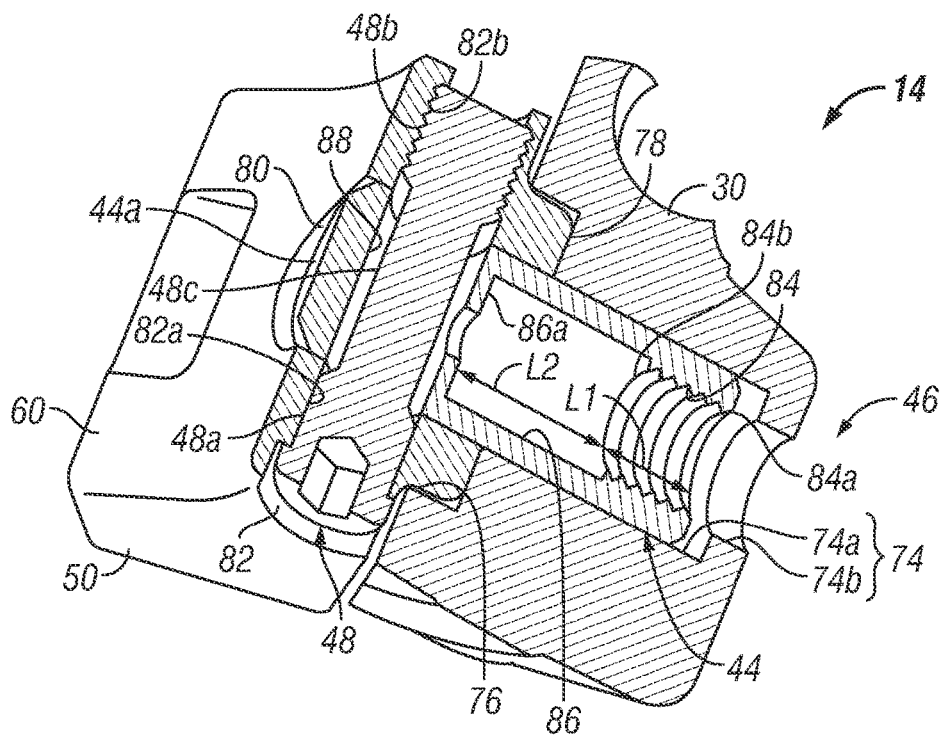
FIG. 12 is a partial cross sectional view, similar to FIG. 8, of the portion of the handlebar clamp assembly illustrated in FIGS. 4 to 7, but with the fixing bolt removed.
Figure 13:
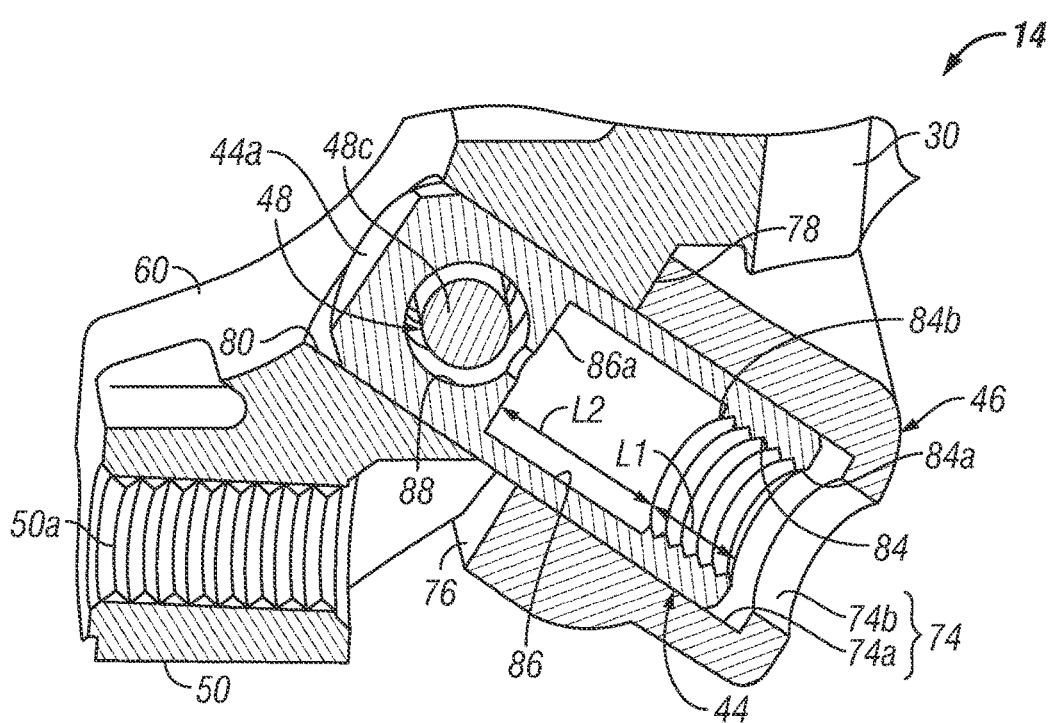
FIG. 13 is a partial cross sectional view, similar to FIG. 9, of the portion of the handlebar clamp assembly illustrated in FIGS. 4 to 7, but with the fixing bolt removed.

As seen in FIGS. 12 and 13, the threaded bore 84 has a bolt entrance opening 84a and a bolt exit opening 84b. The fixing bolt 46 is threadedly engaged with the threaded bore 84 of the fixing nut 44 for releasably attaching the mounting bracket 64 on the handlebar clamp 40. The bolt shaft receiving space 86 is disposed adjacent the bolt exit opening 84b. A surface 86a of the fixing nut 44 extends inwardly to define an end of the bolt shaft receiving space 86, as shown in FIGS. 12 and 13, and to prevent the fixing bolt 46 from passing thereby, as shown in (FIG. 9). The surface 86a is disposed between the bolt exit opening 84b and an end 44a of the fixing nut. The threaded bore 84 has a first axial length L1 between the bolt entrance opening 84a and the bolt exit opening 84b. The bolt shaft receiving space 86 has a second axial length L2 between from the bolt exit opening 84b to its end wall. As explained below, the first and second axial lengths L1 and L2 are dimension to provide the fixing nut 44 with a drop out prevention feature for the fixing bolt 46 in the event the fixing bolt 46 becomes loose. In other words, if the fixing bolt 46 becomes loose, then the fixing nut 44 will retain the fixing bolt 46 in an attached but loose state. In this way, the rider will notice when the fixing bolt 46 becomes loose before the mounting bracket 64 and the second operating component 18 drop off the handlebar clamp 40.

Still referring to FIGS. 12 and 13, the fixing bolt 46 will now be discussed in more detail. Basically, the fixing bolt 46 is threadedly engaged with the threaded bore 84 of the fixing nut 44 for releasably attaching the mounting bracket 64 on the handlebar clamp 40. In particular, the fixing bolt 46 includes a head 90 and a shaft 92 extending from the head 90. The shaft 92 has a first threaded portion 94, a second threaded portion 96 and a non-threaded portion 98 disposed between the first and second threaded portions 94 and 96. The first threaded portion 94 is disposed closer to the head 90 of the fixing bolt 46 than the second threaded portion 96. The first and second threaded portions 94 and 96 are dimensioned to threadedly engage the threaded bore 84 of the fixing nut 44. The non-threaded portion 98 has an axial length that is equal to or slightly greater than the first axial length L1 of the threaded bore 84 of the fixing nut 44. The non-threaded portion 98 also has a smaller diameter than the diameters of the first and second threaded portions 94 and 96.

Basically, the attachment pin 48 fixedly couples the fixing nut 44 to the handlebar clamp 40 in a releasable manner. In particular, the attachment pin 48 includes a first shaft portion 48a, a second shaft portion 48b and a middle shaft portion 48c. The first and second shaft portions 48a and 48b have larger transverse widths than the middle shaft portion 48c. In other words, in the illustrated embodiment, the middle shaft portion 48c has a smaller diameter than the diameters of the first and second shaft portions 48a and 48b. The middle shaft portion 48c is disposed in the attachment opening 88 of the fixing nut 44 while the attachment pin 48 and the fixing nut 44 are in the installed positions. The second shaft portion 48b is screwed into an attachment bore 82 of the handlebar clamp 40.

Since the attachment pin 48 is a threaded pin in the illustrated embodiments, as discussed above, the attachment bore 82 includes a first bore portion 82a and a second bore portion 82b. The first bore portion 82a is a non-threaded bore, while the second bore portion 82b is a threaded bore. The first bore portion 82a is dimensioned to snugly receive the first shaft portion 48a, while the second bore portion 82b is dimensioned be threadedly engaged with the second shaft portion 48b. Alternatively, one or both of the interfaces between the first bore portion 82a and the first shaft portion 48a and the interfaces between the second bore portion 82b and the second shaft portion 48b can be an interference fit for securing the attachment pin 48 within the attachment bore 82. Thus, the thread on the second shaft portion 48b could be eliminated by using a press-fit connection.

The attachment opening 88 of the fixing nut 44 has a larger transverse dimension than the transverse width of the middle shaft portion 48c. However, the transverse dimension of the attachment opening 88 is equal to or slightly greater that the transverse widths of the first and second shaft portions 48a and 48b. The fixing nut 44 is movably disposed in an axial direction of the fixing nut receiving aperture 80 between a first position and a second position. In the illustrated embodiments, the first position corresponds to an attachment pin removal position, while the second position corresponds to an attachment pin drop out prevention position. The fixing nut 44 partially extends into a handlebar receiving area defined by the handlebar engagement surfaces 60 and 62 while the fixing nut 44 is in the first position (the attachment pin removal position). The fixing nut 44 does not extend into the handlebar receiving area while the fixing nut 44 is in the second position (the attachment pin drop out prevention position). In this way, the attachment pin 48 is removably retained in the attachment bore 82 of the handlebar clamp 40 while the fixing nut 44 is in the first position, and is non-removably retained in the attachment bore 82 of the handlebar clamp 40 while the fixing nut 44 is in the second position.

When the fixing bolt 46 is screwed into the fixing nut 44, the fixing nut 44 would be pulling to the outside of the fixing nut receiving aperture 80 (i.e., toward the head 90 of the fixing bolt 46), at that time, one side of inner circumference surface of the attachment opening 88 contacts the middle shaft portion 48c of the attachment pin 48. In this situation, the second shaft portion 48b (i.e., the threaded portion) of the attachment pin 48 cannot pass through the attachment opening 88 of the fixing nut 44. In other word, with the handlebar clamp 40 attached to the handlebar 12, the attachment pin 48 cannot pass through the attachment opening 88 of the fixing nut 44 due to the transverse width of the second shaft portion 48b relative to the transverse width of the attachment opening 88. In particular, the second shaft portion 48b (i.e., the threaded portion) of the attachment pin 48 contacts the fixing nut 44, so the attachment pin 48 cannot pass through the attachment opening 88 of the fixing nut 44. In this way, the attachment pin 48 is prevented from dropping out of the attachment bore 82. Thus, the fixing nut 44 will remain in an attached state, even if the attachment pin 48 is loose, long as the handlebar clamp 40 is fixedly attached on the handlebar 12. Moreover, with the handlebar clamp 40 fixedly attached on the handlebar 12, even if the attachment pin 48 is loose, the fixing bolt 46 does not pull the fixing nut 44 to the outside of the fixing nut receiving aperture 80 (i.e., toward the head 90 of the fixing bolt 46). This is because the fixing nut 44 remains in contact with the middle shaft portion 48c of the attachment pin 48 and thus the fixing nut 44 does not move relative to the handlebar 12.

Figure 14:
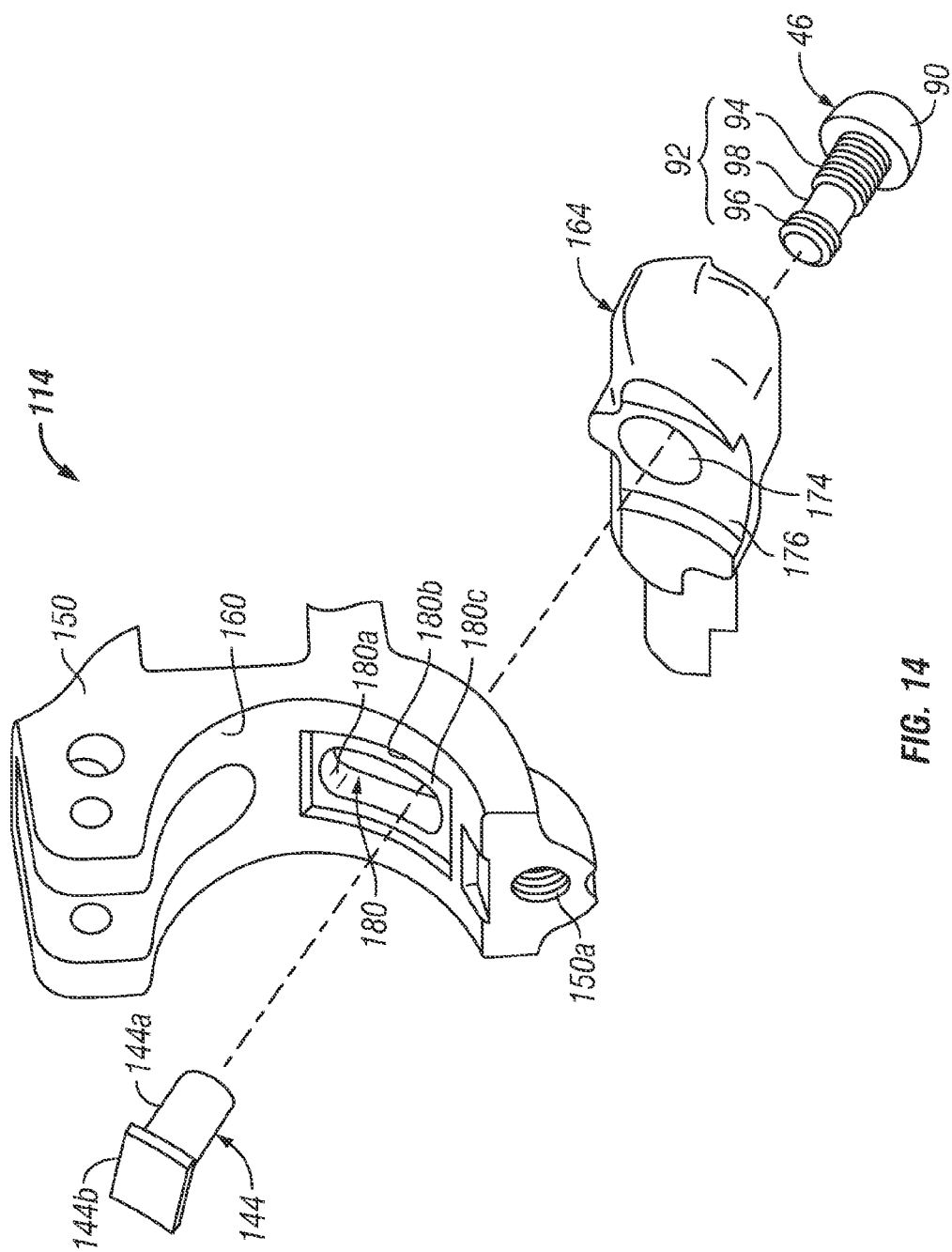
FIG. 14 is a partial exploded perspective view of a portion of a handlebar clamp assembly in accordance with a second embodiment.

Referring now to FIG. 14, a handlebar clamp assembly 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, in this second embodiment, a modified fixing nut 144, a modified first clamp part 150 and a modified mounting bracket 164 are used with the others parts of the handlebar clamp assembly 14 of the first embodiment. In other words, the handlebar clamp of this second embodiment is the same as the handlebar clamp 40 of the first embodiment, except for the first clamp part 150, which is configured to cooperate with the fixing nut 144 and the mounting bracket 164. The fixing nut 144 is configured such that no an attachment pin is needed for securing the fixing nut 144 to the first clamp part 150. Rather, the handlebar 12 will hold the fixing nut 144 in place when the handlebar clamp assembly 114 is attached to the handlebar 12 and the fixing bolt 46 is removed. The fixing nut 144 has a tubular part 144a and a flange part 144b. The tubular part 144a includes a threaded bore and a bolt shaft receiving space that are identical to the threaded bore 84 and the bolt shaft receiving space 86 of the first embodiment. Thus, the fixing nut 144 threadedly receives the fixing bolt 46 in the same manner as the first embodiment. Thus, upon the fixing bolt 46 becoming loose, the fixing nut 144 retains the fixing bolt 46 in an attached but loose state, so as to prevent complete disengagement of the fixing bolt 46 from the fixing nut 144 in the same manner as the first embodiment.

The first clamp part 150 of the handlebar clamp has a handlebar engagement surface 160 and a fixing nut receiving aperture 180 that extends through the first clamp part 150 of the handlebar clamp to the handlebar engagement surface 160. The fixing nut receiving aperture 180 has a first aperture section 180a and a second aperture section 180b with an abutment surface 180c extending in a radial direction between the first and second aperture sections 180a and 180b with respect to a center axis of the fixing nut receiving aperture 180. The first aperture section 180a is an elongated slot that extends in the circumferential direction of the handlebar engagement surface 160. The second aperture section 180b is also an elongated slot that extends in the circumferential direction of the handlebar engagement surface 160. The first and second aperture sections 180a and 180b of the fixing nut receiving aperture 180 are elongated in a circumferential direction of the handlebar engagement surface 160 of the handlebar clamp for adjusting a fixed position of the fixing nut 144. In other words, the first and second aperture sections 180a and 180b are dimensioned relative to the tubular part 144a and the flange part 144b so that a fixed position of the fixing nut 144 can be adjusted in the circumferential direction of the handlebar engagement surface 160. With the fixing nut 144 disposed in the fixing nut receiving aperture 180, the tubular part 144a extends through the first aperture section 180a and into a bore 174 of the mounting bracket 164. Also with the fixing nut 144 disposed in the fixing nut receiving aperture 180, the flange part 144b of the fixing nut 144 is disposed in the second aperture section 180b. The second aperture section 180b and the abutment surface 180c define an interior channel in the handlebar engagement surface 160. The interior channel defined by the second aperture section 180b and the abutment surface 180c is dimensioned so that the flange part 144b fits snugly therein when the handlebar clamp assembly 114 is securely attaches to the handlebar 12. Thus, with the flange part 144b located in the second aperture section 180b and the tubular part 144a extending through the first aperture section 180, the end surface of the flange part 144b is substantially flush with the handlebar engagement surface 160 when the handlebar clamp assembly 114 is securely attaches to the handlebar 12.

Referring now to FIG. 15, a handlebar clamp assembly 214 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Here, in this third embodiment, a modified housing 230 which forms a part of a modified handlebar clamp is used with the others parts of the handlebar clamp assembly 14 of the first embodiment. More specifically, the handlebar clamp 240 includes a first clamp part 250 and a second clamp part 252, with the first clamp part 250 being integrally formed with the housing 230. Here, the first and second clamp parts 250 and 252 have first and second ends releasably fastened together by two of the bolts 56 (fasteners) of the first embodiment. Other than the first and second clamp parts 250 and 252 being releasably fastened together by two of the bolts 56, the handlebar clamp assembly 214 is identical to the handlebar clamp assembly 14 of the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle handlebar clamp assembly comprising:
   a handlebar clamp configured to clamp a handlebar having a longitudinal center axis, the handlebar clamp having a fixing nut receiving aperture;
   a fixing nut having a threaded bore and an attachment opening, the fixing nut being movably disposed in the fixing nut receiving aperture in an axial direction of the fixing nut receiving aperture between a first position and a second position;
   a fixing bolt threadedly engaged with the threaded bore of the fixing nut; and
   an attachment pin coupling the fixing nut to the handlebar clamp, the attachment pin including a first shaft portion, a second shaft portion and a middle shaft portion, each of the first and second shaft portions having a diameter larger than a diameter of the middle shaft portion and an axial length of the middle shaft portion being longer than an axial length of each of the first and second shaft portions, the diameters being substantially perpendicular to a longitudinal axis in an axial direction of the attachment pin, the middle shaft portion being disposed in the attachment opening of the fixing nut, the attachment pin being removably received by the fixing nut, the longitudinal axis of the attachment pin being substantially parallel to the longitudinal axis of the handlebar when the handlebar clamp is clamped to the handlebar, and the attachment pin being integrally formed as a one-piece member.

2. The bicycle handlebar clamp assembly according to claim 1, wherein
   the second shaft portion is screwed into an attachment bore of the handlebar clamp.

3. The bicycle handlebar clamp assembly according to claim 1, wherein
   the handlebar clamp has a handlebar engagement surface and an attachment bore with the attachment pin disposed therein.

4. The bicycle handlebar clamp assembly according to claim 3, wherein
the fixing nut receiving aperture extends through the handlebar clamp to the handlebar engagement surface,
the attachment opening of the fixing nut has a larger transverse dimension than the diameter of the middle shaft portion,
the fixing nut extends into a handlebar receiving area defined by the handlebar engagement surface while the fixing nut is in the first position, and
the fixing nut does not extend into the handlebar receiving area while the fixing nut is in the second position.

5. The bicycle handlebar clamp assembly according to claim 1, wherein
the handlebar clamp includes a first clamp part and a second clamp part, a first end of each of the first and second clamp parts being hinged together and a second end of each of the first and second clamp parts being fastened together by a fastener.

6. The bicycle handlebar clamp assembly according to claim 1, wherein
the handlebar clamp includes a first clamp part and a second clamp part, a first end of each of the first and second clamp parts being fastened together by a first fastener and a second end of each of the first and second clamp parts being fastened together by a second fastener.

7. The bicycle handlebar clamp assembly according to claim 1, further comprising
a component mounting bracket attached to the handlebar clamp by the fixing bolt.

8. The bicycle handlebar clamp assembly according to claim 7, further comprising
at least one of a gear shifting operation device, a suspension controller and a seat height controller attached to the component mounting bracket.

9. The bicycle handlebar clamp assembly according to claim 1, further comprising
a brake lever pivotally mounted to the handlebar clamp.

* * * * *